(12) United States Patent
Matsushima

(10) Patent No.: US 12,138,988 B2
(45) Date of Patent: Nov. 12, 2024

(54) CAB FOR CONSTRUCTION MACHINE

(71) Applicant: KOBELCO CONSTRUCTION MACHINERY CO., LTD., Hiroshima (JP)

(72) Inventor: Shinnosuke Matsushima, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 302 days.

(21) Appl. No.: 17/654,168

(22) Filed: Mar. 9, 2022

(65) Prior Publication Data

US 2022/0314736 A1 Oct. 6, 2022

(30) Foreign Application Priority Data

Mar. 30, 2021 (JP) ................................ 2021-058274

(51) Int. Cl.
*B60H 1/00* (2006.01)
*E02F 9/08* (2006.01)
*E02F 9/16* (2006.01)

(52) U.S. Cl.
CPC ..... *B60H 1/00357* (2013.01); *B60H 1/00564* (2013.01); *E02F 9/0858* (2013.01); *E02F 9/16* (2013.01)

(58) Field of Classification Search
CPC ....................... B60H 1/00357; B60H 1/00378
See application file for complete search history.

(56) References Cited

U.S. PATENT DOCUMENTS 5,076,637 A * 12/1991 Larkin ....................... B60J 1/14
296/146.16
6,450,284 B1 * 9/2002 Sakyo ....................... E02F 9/26
340/684
10,787,154 B2 * 9/2020 Hagan ....................... B60S 1/54
(Continued)

FOREIGN PATENT DOCUMENTS

EP 2921328 A2 * 9/2015 ......... B60H 1/00378
JP 7-47835 A 2/1995
JP 2004-74884 A 3/2004
(Continued)

OTHER PUBLICATIONS

Extended European Search Report issued Aug. 11, 2022, in corresponding European Patent Application No. 22159069.8, 8 pages.

*Primary Examiner* — Daniel J Colilla
(74) *Attorney, Agent, or Firm* — Oblon, McClelland, Maier & Neustadt, L.L.P.

(57) ABSTRACT

A cab for a construction machine includes: a specified side wall having a side window frame defining a side window and at least one side transparent plate supported by the side window frame; an air conditioner unit having an air conditioner outlet hole; a side beam extending in a front-rear direction along the specified side wall and below the side window frame; and a side duct located above the side beam, extending in the front-rear direction along a lower section of the side window frame, and receiving at least a part of the air blown out from the air conditioner unit, the side duct having at least one side duct vent for blowing out the air toward the at least one side transparent plate.

12 Claims, 9 Drawing Sheets

(56) References Cited

U.S. PATENT DOCUMENTS

2006/0006696 A1     1/2006   Umemoto et al.
2012/0038186 A1*   2/2012   Takaoka ................. E02F 9/163
                                                                                          296/190.03

FOREIGN PATENT DOCUMENTS

| JP | 2005186768 A | * | 7/2005 | | |
|----|--------------|---|--------|---|---|
| JP | 2007245894 A | * | 9/2007 | | |
| JP | 2008-285162 A | | 11/2008 | | |
| JP | 2020015463 A | * | 1/2020 | ......... | B60H 1/00021 |
| WO | WO-9112150 A1 | * | 8/1991 | ............. | B60H 1/247 |

\* cited by examiner

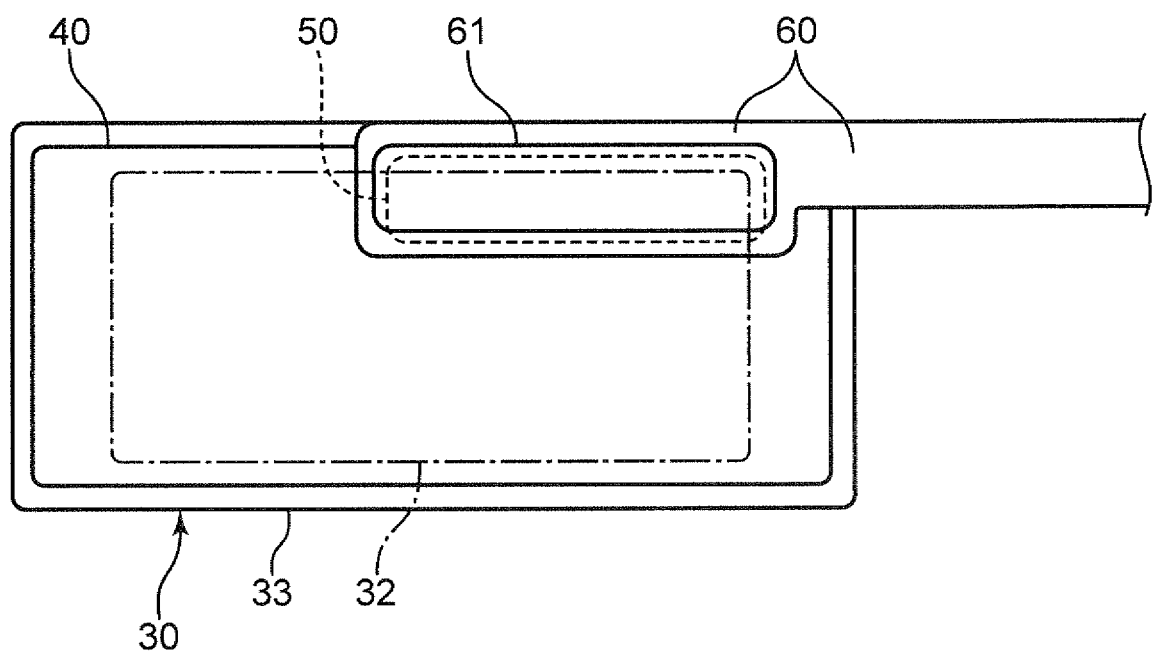

CAB FOR CONSTRUCTION MACHINE

FIELD OF THE INVENTION

This disclosure relates to a cab for a construction machine, including an air conditioner unit.

BACKGROUND ART

A hydraulic excavator disclosed in Japanese Unexamined Patent Publication No. 2007-245894 includes an air conditioner, and a pipe device extending from the air conditioner along a side surface, which is closer to a working device, and a rear surface of a cab therein. Wind generated by the air conditioner is supplied to the rear of an operator seat through a first side-surface duct, a second side-surface duct, a rear surface-crossing duct, and right and left rear surface tower-like ducts each included in the pipe device. A hydraulic excavator disclosed in Japanese Unexamined Patent Publication No. 2008-285162 includes an air conditioning unit, a middle duct, an upper duct, and a lower duct. Air conditioned in the air conditioning unit passes through the middle duct, the upper duct, and the lower duct to be further blown out to an inside of a cab through a blowing member. Each hydraulic excavator disclosed in Japanese Unexamined Patent Publication No. 2007-245894 and Japanese Unexamined Patent Publication No. 2008-285162 includes: a left wall having a getting-in-and-out section; a right wall having a side window frame defining a side window; and an air conditioner unit and a duct each extending along the right wall so as not to hinder an operator from getting in or out of the excavator.

Nevertheless, a construction machine, such as the hydraulic excavator, desirably includes a side beam extending in a front-rear direction along a right wall and below a side window frame for reinforcing the right wall. Besides, a transparent plate, such as a glass plate, for closing the side window may be frosted or fogged, and thus, the side duct extending in the front-rear direction along the right wall preferably has a vent for blowing out conditioned air toward the transparent plate to ensure the visibility of the operator through the transparent plate. Moreover, the vent is preferably located near the transparent plate to effectively suppress such frosting or fogging.

For instance, the side beam is arranged to extend in the front-rear direction along a lower section of the side window frame and the side duct is arranged to extend in the front-rear direction along the side beam and below the side beam. In this arrangement, a downward distance from the transparent plate to the side duct increases. For the location of the vent near the transparent plate, a probable way is, for example, to provide an extension duct extending upward from the side duct to a position near the transparent plate and having an upper end formed with such a vent. However, an amount of air blown out of the vent tends to be small in the structure including the extension duct branching and extending upward from the side duct extending in the front-rear direction. Alternatively, another probable way includes, for example, arranging the side duct in adjacent to the side beam at a left position thereof, and forming the vent in an upper portion of the side duct to achieve the location of the vent near the transparent plate. However, in the structure where the side beam and the side duct are juxtaposed to each other in a left-right direction, the side beam and the side duct protrude inward (leftward) in the inner space of the cabin in a width direction thereof by a total width which is a sum of respective widths of the side beam and the side duct, resulting in narrowing the inner space of the cab.

SUMMARY OF THE INVENTION

This disclosure has been made to solve the drawbacks described above, and it is an object of this disclosure to provide a cab for a construction machine, which can suppress narrowing of an inner space of the cab and further attain reinforcement of a side wall and ensure visibility.

A provided cab for a construction machine includes: a right wall and a left wall spaced from each other in a left-right direction, one of the right and left walls having a getting-in-and-out section, and the other of the right and left walls serving as a specified side wall having a side window frame defining a side window and at least one side transparent plate supported by the side window frame; an air conditioner unit having an air conditioner outlet hole for blowing out air; a side beam extending in a front-rear direction along the specified side wall and below the side window frame; and a side duct located above the side beam, extending in the front-rear direction along a lower section of the side window frame, and receiving at least a part of the air blown out from the air conditioner unit, the side duct having at least one side duct vent for blowing out the air toward the at least one side transparent plate.

BRIEF DESCRIPTION OF THE DRAWINGS

FIG. 9 is a schematic plan view explaining a positional relationship, in the cab, among an air conditioner outlet hole of an air conditioner unit, an upstream duct, a guide duct, a side duct, and a side duct vent.

DESCRIPTION OF EMBODIMENTS

Hereinafter, an embodiment of this disclosure will be described with reference to the accompanying drawings.

Overall Configuration of Construction Machine

Figure 1:
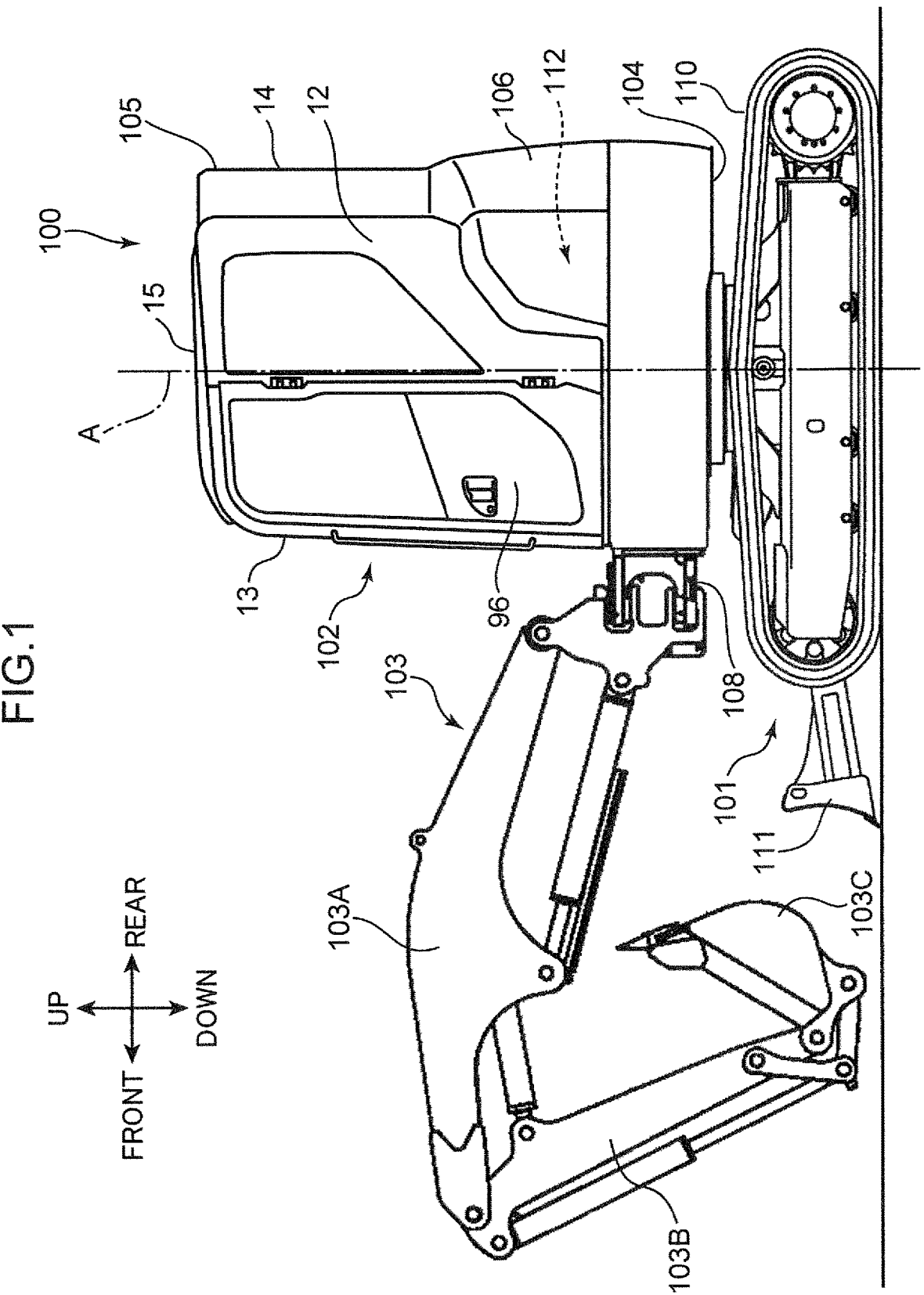
FIG. 1 is a sideview of a construction machine including a cab according to an embodiment of the disclosure.
Figure 2:
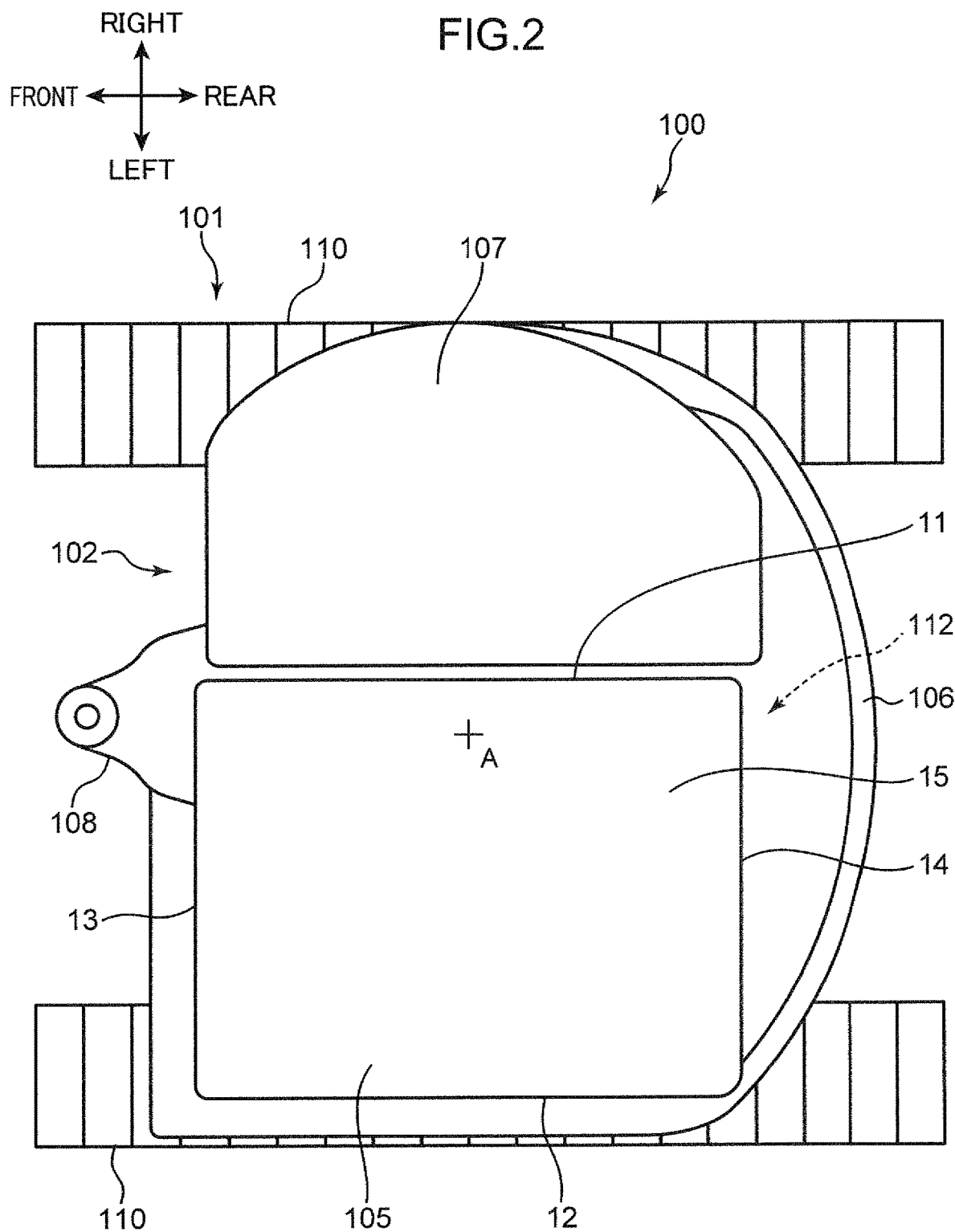
FIG. 2 is a plan view explaining an arrangement of the cab in the construction machine.

FIG. 1 is a side view of a hydraulic excavator 100 including a cab 105 according to the embodiment. FIG. 2 is a plan view explaining an arrangement of the cab 105 in the hydraulic excavator 100. The hydraulic excavator 100 according to the embodiment as shown in FIG. 1 and FIG. 2 is a short rear tail swing hydraulic excavator. The short rear tail swing hydraulic excavator is an example of a construction machine.

The hydraulic excavator 100 includes a lower traveling body 101, an upper stewing body 102 slewably supported on the lower traveling body 101, and a working device 103 tiltably supported on the upper slewing body 102.

The directions denoted by "UP", "DOWN", "FRONT", "REAR", "LEFT", and "RIGHT" in the drawings are based on a direction in which the upper stewing body 102 of the hydraulic excavator 100 faces. It should be noted that each of the directions is defined for convenience to explain the hydraulic excavator 100 according to the embodiment, and thus does not delimit any moving direction or use way of the hydraulic excavator 100.

The lower traveling body 101 includes: a pair of right and left crawler traveling devices 110, 110; an unillustrated lower frame connecting the crawler travelling devices 110, 110 and supporting the upper slewing body 102 thereon; and a dozer 111 having a proximal end rotatably attached to the lower frame. FIG. 2 omits the illustration of the working device 103 and the dozer 111.

The upper slewing body 102 includes: an upper frame 104 supported on the lower frame of the lower traveling body 101 slweably about a vertical slewing central axis A extending in an up-down direction; the cab 105 having a box shape and supported on the upper frame 104; a counterweight 106 supported on a rear portion of the upper frame 104; a machine chamber 107 supported on the upper frame 104; and a working device attachment part 108 arranged at a front portion of the upper frame 104.

The cab 105 and the machine chamber 107 are juxtaposed to each other in the left-right direction in front of the counterweight 106 in a plan view. Specifically, the cab 105 is located at a left position of the machine chamber 107, and the cab 105 further has a center deviating leftward from the stewing central axis A in a width direction (left-right direction) thereof. The machine chamber 107 accommodates various devices, e.g., a hydraulic pump and a tank, arranged therein. Moreover, the counterweight 106 and the cab 105 define a space therebetween for accommodating, for example, an engine 112 therein. Here, the arrangement of the cab 105, the machine chamber 107, and the engine 112 is not limited to the specific example shown in FIG. 1 and FIG. 2, and various arrangements are adoptable depending on a specification of the construction machine.

The working device 103 includes a boom 103A, an arm 103B, a bucket 103C, and a plurality of hydraulic cylinders for respectively operating these elements. The boom 103A has a proximal end attached to the working device attachment part 108. The arm 103B has a proximal end rotatably attached to a distal end of the boom 103A. The bucket 103C is rotatably attached to a distal end of the arm 103B.

Overall Configuration of Cab

Figure 3:
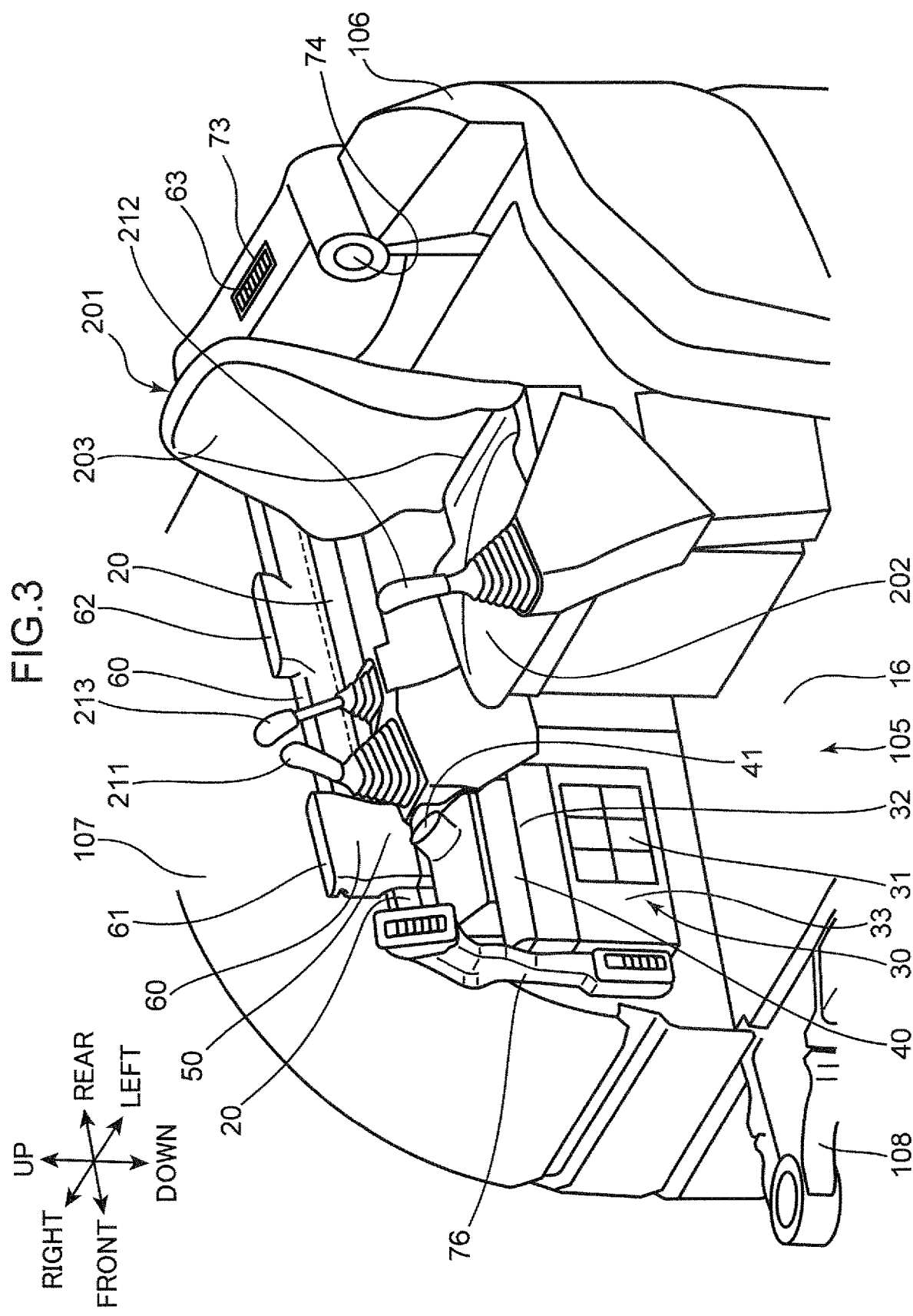
FIG. 3 is a perspective view showing an inner part of the cab.
Figure 4:
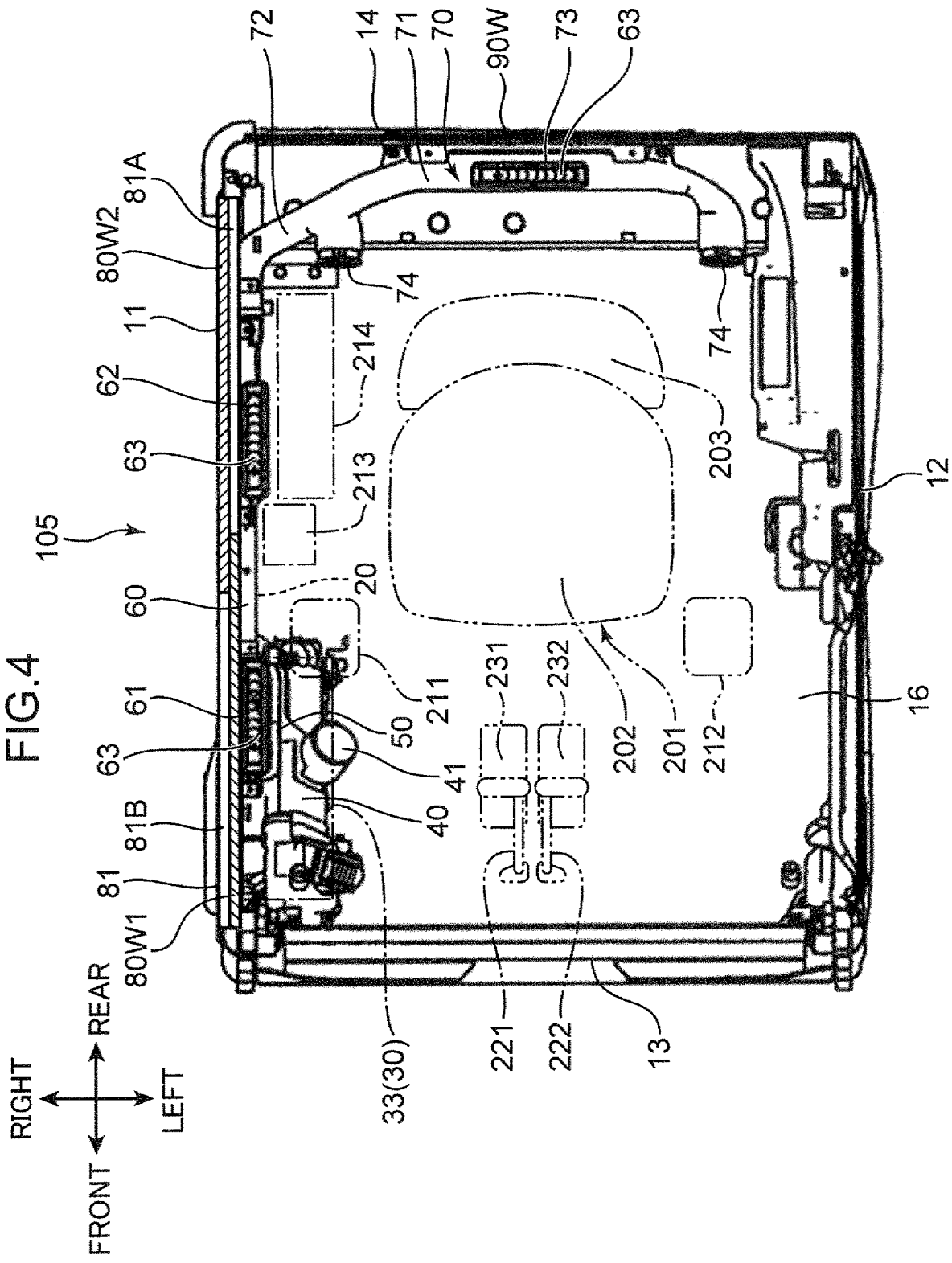
FIG. 4 is a plan view showing the inner part of the cab.

FIG. 3 is a perspective view showing an inner part of the cab 105. FIG. 4 is a plan view showing the inner part of the cab 105. As shown in FIG. 1 to FIG. 4, the cab 105 includes: a plurality of walls 11 to 14; a top plate 15; a bottom plate 16; a side beam 20; an air conditioner unit 30; a plurality of ducts 40, 50, 60, 70, 76; an operator seat 201; right and left working device manipulation levers 211, 212; a dozer manipulation lever 213; right and left traveling pedals 231, 232; right and left traveling levers 221, 222; and a manipulation panel 214.

The walls 11 to 14 include a right wall 11 and a left wall 12 spaced from each other in the left-right direction, and a front wall 13 and a rear wall 14 spaced from each other in the front-rear direction. The front wall 13 connects a front end of the right wall 11 and a front end of the left wall 12, the rear wall 14 connects a rear end of the right wall 11 and a rear end of the left wall 12. The top plate 15 and the bottom plate 16 are spaced from each other in the up-down direction. The walls 11 to 14, and the top plate 15 and the bottom plate 16 define the inner space thereamong. The right wall 11 includes a right surface of the cab 105. The right wall 11 serves as an exemplary specified side wall. The left wall 12 includes a left surface of the cab 105. The front wall 13 includes a front surface of the cab 105. The rear wall 14 includes a rear surface of the cab 105. The top plate 15 includes a top surface of the cab 105. The bottom plate 16 includes a floor surface of the cab 105.

Figure 5:
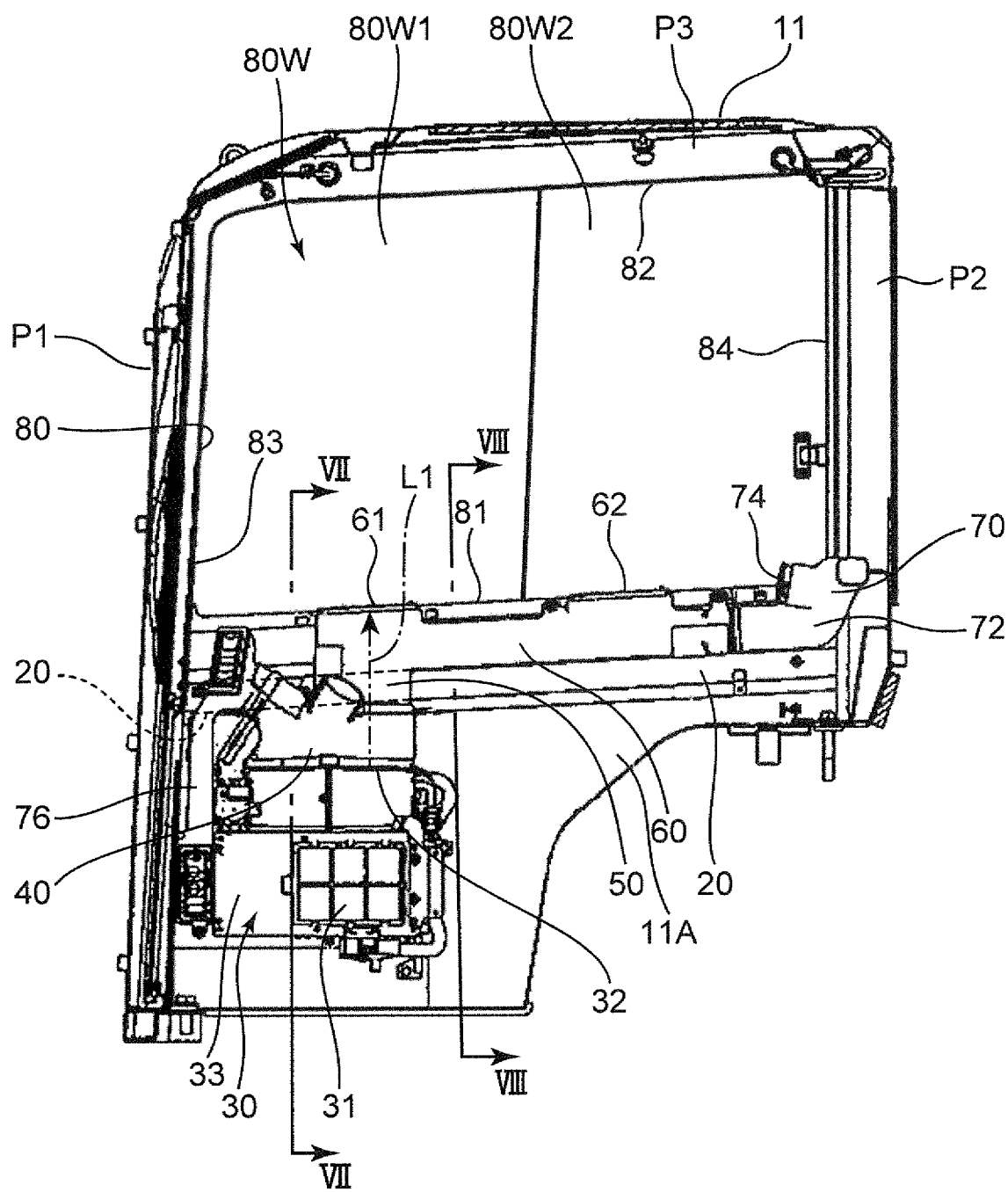
FIG. 5 is a sideview showing a right wall of the cab.

As shown in FIG. 5, the right wall 11 includes a right front pillar P1, a right rear pillar P2, a right upper beam P3, a right panel 11A, a first side transparent plate 80W1, and a second side transparent plate 80W2. As shown in FIG. 5, the right front pillar P1 has a pillar shape extending in the up-down direction in a right front portion of the cab 105, and the right rear pillar P2 has a pillar shape extending in the up-down direction in a right rear portion of the cab 105. The right upper beam P3 extends in the front-rear direction to connect an upper end of the right front pillar P1 and an upper end of the right rear pillar P2. The right panel 11A is a plate member connecting the right front pillar P1 and the right rear pillar P2 in the front-rear direction.

The hydraulic excavator 100 according to the embodiment is a short rear tail swing hydraulic excavator as described above, and the right panel 11A has a shape with a notch at the rear and lower portion thereof to ensure a space for arrangement of, for example, the engine 112 as shown in FIG. 5.

The right wall 11 has a side window frame 80 defining the right window 80W. The side window frame 80 is located above the right panel 11A. The first side transparent plate 80W1 and the second side transparent plate 80W2 fit in the side window frame 80 to be supported by the side window frame 80. Each of the first side transparent plate 80W 1 and the second side transparent plate 80W2 may be, for example, a transparent glass plate or a transparent resin plate. The first side transparent plate 80W1 and the second side transparent plate 80W2 ensure the right visibility of an operator sitting on the operator seat 201. Particularly, the first side transparent plate 80W1 ensures the diagonally forward right visibility. The operator can maneuver the hydraulic excavator 100 while visually checking the working device 103 including the bucket 103C through the first side transparent plate 80W1. Besides, suppression of frosting or fogging at the first side transparent plate 80W1 and the second side transparent plate 80W2 results in ensuring the visibility through the side transparent plates 80W1, 80W2. Accordingly, the operator can confirm a situation around the hydraulic excavator 100, which leads to an increased safety of a work. The side window frame 80 exemplifies a side window frame, and a right window SOW exemplifies a side window.

The side window frame 80 has a lower section 81 (lower member) extending in the front-rear direction, an upper section 82 (upper member) spaced upward from the lower section 81 and extending in the front-rear direction, a front section 83 (front member) extending in the up-down direction to connect a front end of the lower section 81 and a front end of the upper section 82, and a rear section 84 (rear member) extending in the up-down direction to connect a rear end of the lower section 81 and a rear end of the upper section 82.

Figure 8:
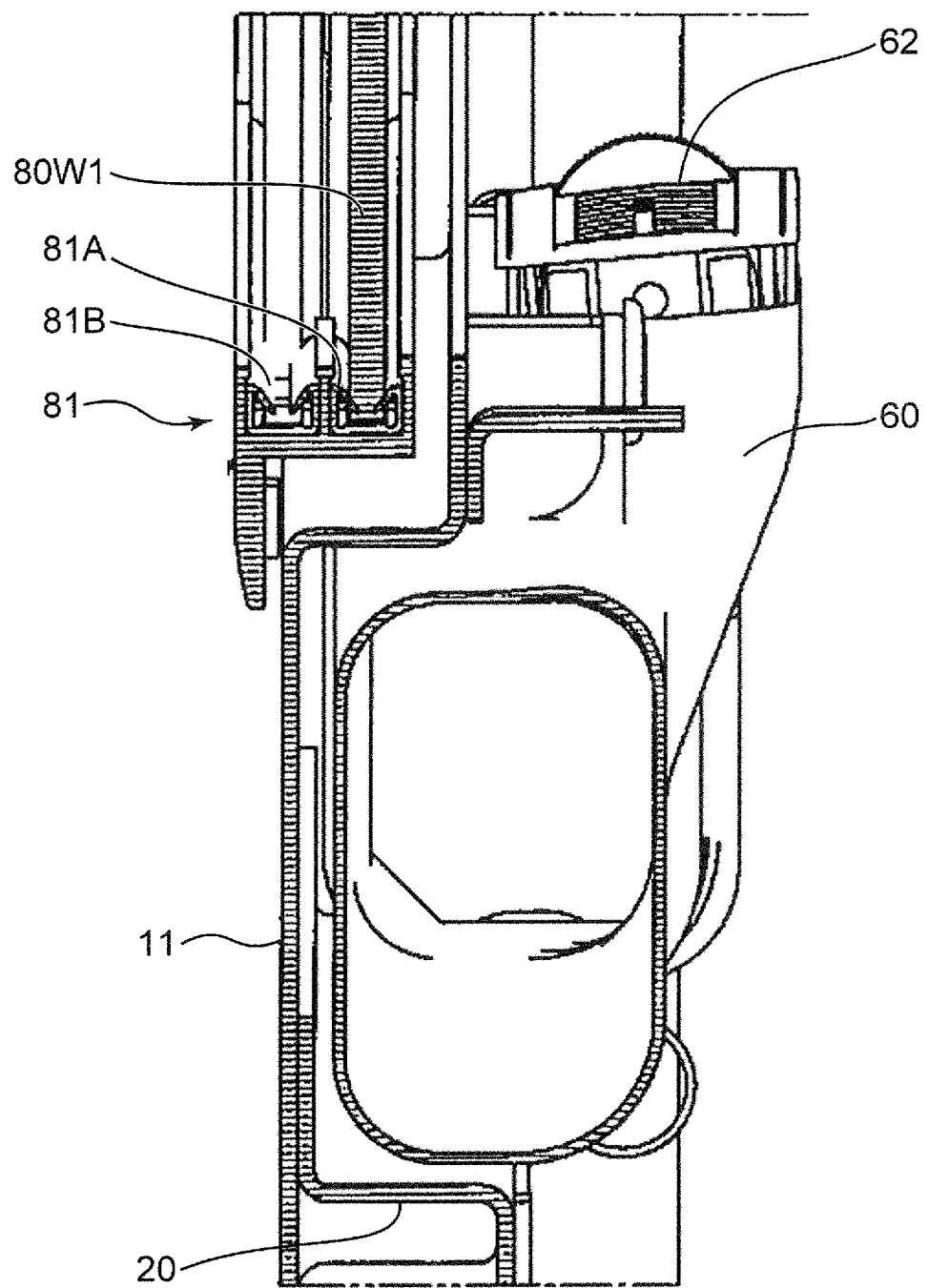
FIG. 8 is a cross-sectional view taken along the line VIII-VIII in FIG. 5.

As shown in FIG. 4, the lower section 81 has an inner groove 81A extending in the front-rear direction and an outer groove 81B extending in the front-rear direction at an outer position (right position) of the inner groove 81A. As shown in FIG. 8, each of the inner groove 81A and the outer groove 81B has a glass run made of a resin sealing component and extending in the front-rear direction. Although unillustrated, the upper section 82 has an inner groove and an outer groove in the same manner as the lower section 81.

The first side transparent plate 80W1 has such a shape as to close a front portion of the right window 80W, and the second side transparent plate 80W2 has such a shape as to close a rear portion of the right window 80W. In the specific example shown in FIG. 5, each of the first side transparent plate 80W1 and the second side transparent plate 80W2 has a quadrangular shape in a side view. The first transparent plate 80W1 is, for example, held in the inner groove 81A of the lower section 81 slidably in the inner groove 81A in the front-rear direction, and the second side transparent plate 80W2 is, for example, held in the outer groove 81B of the lower section 81 slidably in the outer groove 81B in the front-rear direction. Alternatively, the first side transparent plate 80W1 may be held in the outer groove 81B, and the second side transparent plate 80W2 may be held in the inner groove 81A.

As shown in FIG. 1, the left wall 12 has a getting-in-and-out section 96. The getting-in-and-out section 96 is provided with a door which allows the operator to get in or out of the cab 105. The door has a window (left window) and the front wall 13 has a front window.

Figure 6:
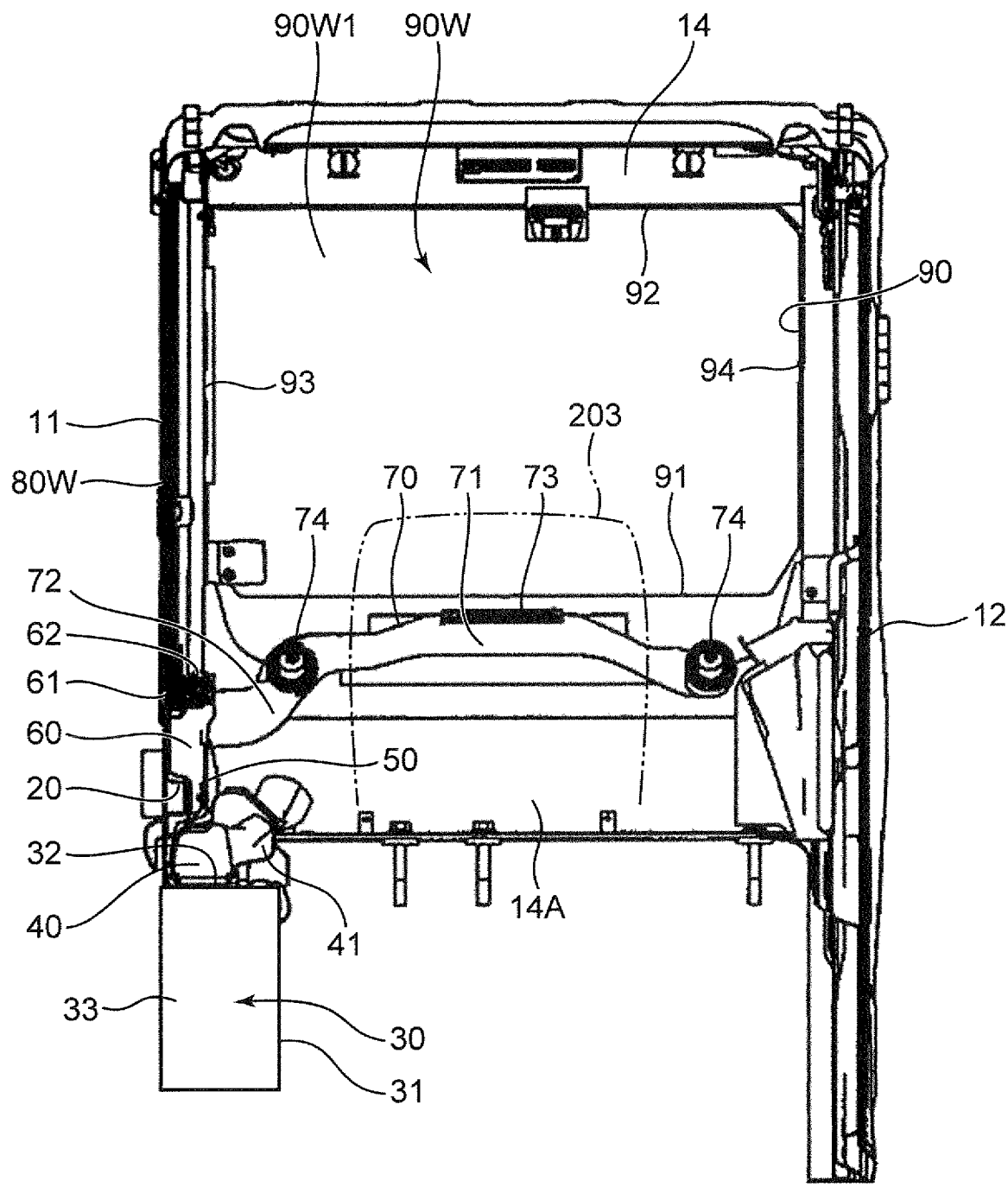
FIG. 6 is a front view showing the inner part of the cab.

As shown in FIG. 6, the rear wall 14 has a rear panel 14A and a rear transparent plate 90W1. The rear panel 14A has a rear window frame 90 defining a rear window 90W. The rear window frame 90 is located above the rear panel 14A. The rear transparent plate 90W1 fits in the rear window frame 90 to be supported by the rear window frame 90. The rear transparent plate 90W1 may be, for example, a transparent glass plate or a transparent resin plate. The rear transparent plate 90W1 ensures the rear visibility of the operator sitting on the operator seat 201.

The rear window frame 90 has a lower section 91 extending in the left-right direction, an upper section 92 spaced upward from the lower section 91 and extending in the left-right direction, a right section 93 extending in the up-down direction to connect a right end of the lower section 91 and a right end of the upper section 92, and a left section 94 extending in the up-down direction to connect a left end of the lower section 91 and a left end of the upper section 92. The rear transparent plate 90W1 has such a shape as to close the rear window 90W. In the specific example in FIG. 6, the rear transparent plate 90W1 has a quadrangular shape in the front view.

The side beam 20 is a reinforcement member for reinforcing a portion of the right wall 11 near the lower section 81 of the side window frame 80. The side beam 20 extends in the front-rear direction along the right wall 11 and below the side window frame 80. The air conditioner unit 30 is a device for conditioning air in the inner space of the cab 105. The air conditioner unit 30 has at least one of a cooling function, a warming function, and a dehumidifying function. The ducts 40, 50, 60, 70, 76 may convey the air (conditioned air) blown out from the air conditioner unit 30 to a plurality of predetermined regions in the cab 105. The details of the side beam 20, the air conditioner unit 30, and the ducts 40, 50, 60, 70, 76 will be described later.

The operator seat 201 allows the operator to sit thereon. The operator seat 201 is located around the center of the cab 105 in the plan view. The operator seat 201 has a seat base 202 and a backrest 203. The seat base 202 receives the buttocks of the operator thereon. The backrest 203 is attached to a rear end of the seat base 202 and stands upward from the rear end to support the torso of the operator.

Each of the right and left working device manipulation levers 211, 212 is a manipulation member to which a manipulation for causing the working device 103 to operate and causing the upper slewing body 102 to slew is given. Specifically, for instance, the right working device manipulation lever 211 receives a manipulation for causing the boom 103A to rise or be lowered and a manipulation for causing the bucket 103C to rotate as given thereto. The left working device manipulation lever 212 receives a manipulation for causing the arm 103B to rotate and a manipulation for causing the upper slewing body 102 to slew as given thereto. However, allotment of the operability to the right and left working device manipulation lever 211, 212 is not limited to the aforementioned specific example. The dozer manipulation lever 213 is a manipulation member for causing the dozer 111 to rotate. In the specific example shown in FIG. 4, the right working device manipulation lever 211 is at a diagonally forward right position of the operator seat 201, the left working device manipulation lever 212 is at a diagonally forward left position of the operator seat 201, and the dozer manipulation lever 213 is at a right position of the operator seat 201.

Each of the traveling levers 221, 222 shown in FIG. 4 is a manipulation member to which a manipulation for causing the lower traveling body 101 to travel is given. Similarly, each of the traveling pedals 231, 232 is a manipulation member to which a manipulation for causing the lower traveling body 101 to travel is given. The manipulation panel 214 has, for example, a plurality of switches. In the specific example shown in FIG. 4, the traveling levers 221, 222 and the traveling pedals 231, 232 are located in front of the operator seat 201, and the manipulation panel 214 is at a diagonally backward right position of the operator seat 201. FIG. 3 omits the illustration of the traveling levers 221, 222 and the traveling pedals 231, 232.

The schematic structure of the cab 105 has been described heretofore. Hereinafter, the side beam 20, the air conditioner unit 30, and the ducts 40, 50, 60, 70, 76 will be described in more detail.

The air conditioner unit 30 includes an air conditioner casing 33 having a box shape, and various components accommodated in the air conditioner casing 33. The various components may include, for example, a coolant pipe for allowing a coolant to flow therein and a heat exchanger for heat exchange between the coolant and the air. Although the air conditioner casing 33 has a substantially rectangular parallelepiped shape in the specific example shown in each of FIG. 3 to FIG. 6, the shape of the air conditioner casing 33 is not limited to the rectangular parallelepiped shape. In FIG. 4, the shape and the position of the air conditioner casing 33 of the air conditioner unit 30 are expressed by a framed box denoted by a long dashed short dashed line.

The air conditioner unit 30 has an air conditioner inlet hole 31 for taking air in the inner space of the cab 105 into the air conditioner casing 33, and an air conditioner outlet hole 32 for blowing out, to the inner space of the cab 105, air (conditioned air) whose temperature or humidity is adjusted. Although the air conditioner inlet hole 31 is formed on a left surface of the air conditioner casing, and the air conditioner outlet hole 32 is formed on a top surface of the air conditioner casing 33 in the embodiment, the position of the air conditioner inlet hole 31 and the position of the air conditioner outlet hole 32 are not respectively limited to the left surface and the top surface of the air conditioner casing 33.

The air conditioner unit 30 lies along a front portion of the right wall 11. Specifically, the air conditioner unit 30 lies along a front and lower portion of the right wall 11. The air conditioner unit 30 is located below the first side transparent plate 80W1 in the side view in FIG. 5. The air conditioner unit 30 is adjacent to an inner surface of the right wall 11

(inner surface of the right panel 11A). As shown in FIG. 4, the air conditioner unit 30 has a larger length in the front-rear direction than a width thereof in the left-right direction.

Figure 7:
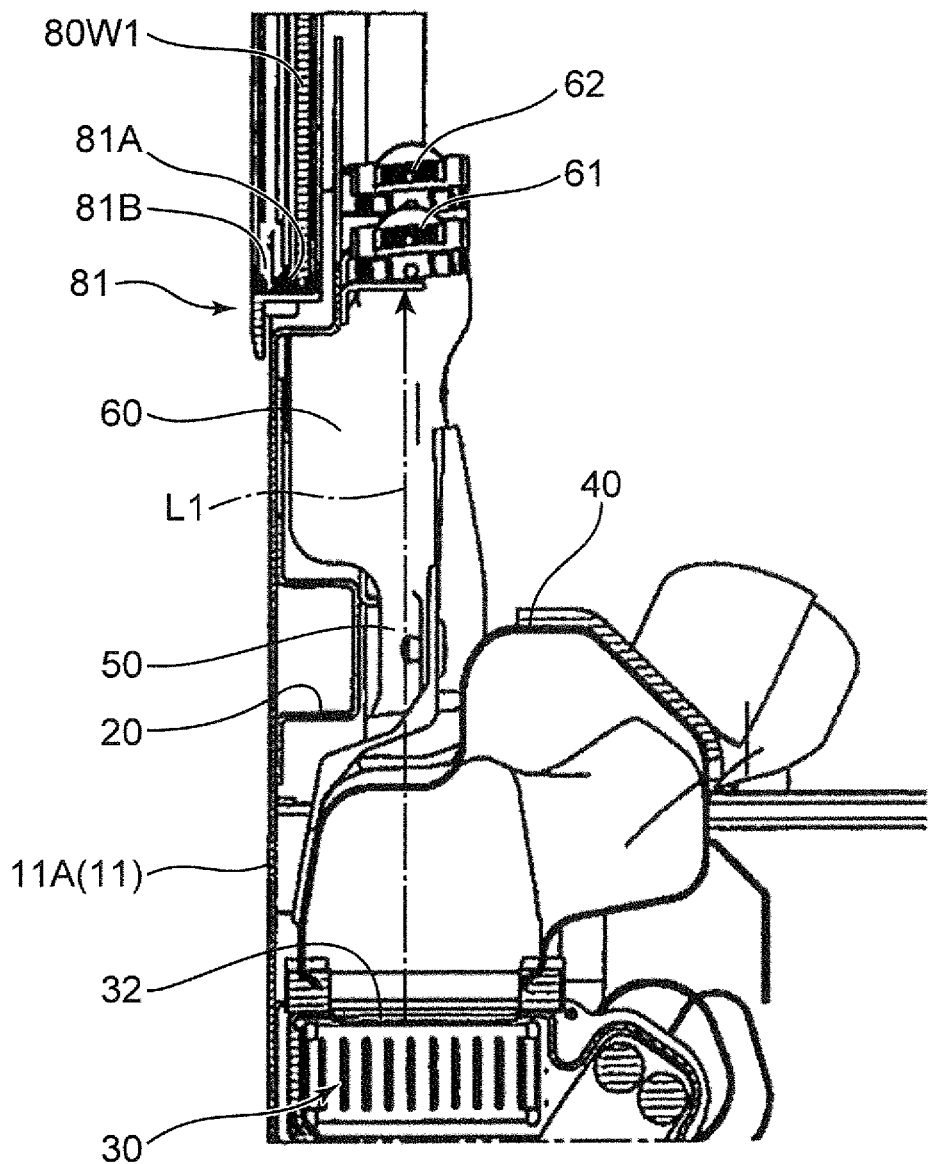
FIG. 7 is a cross-sectional view taken along the line VII-VII in FIG. 5.

As shown in FIG. 5, the side beam 20 is located above the air conditioner unit 30 and extends in the front-rear direction along the inner surface of the right wall 11. The side beam 20 has such a shape as to extend from the front end to the rear end of the right wall 11. Specifically, the side beam 20 extends to be linearly continuous from the right front pillar P1 to the right rear pillar P2. As shown in FIG. 7, the side beam 20 is fixedly attached to the inner surface of the right panel 11A of the right wall 11. The side beam 20 has such a cross-sectional shape that the side beam 20 and the right panel 11A can define a closed cross-section. In the specific example shown in FIG. 7, the closed cross-section has a quadrangular shape. However, the shape of the closed cross-section is not limited to the quadrangular shape. Furthermore, the side beam 20 may be a tubular (polygonal pipe-like or cylindrical) member solely defining the closed cross-section.

The plurality of ducts include an upstream duct 40, a guide duct 50, a side duct 60, a rear duct 70, and a front duct 76. FIG. 3 omits the illustration of cover members for respectively covering the upstream duct 40, the guide duct 50, the side duct 60, and the front duct 76 so that the positions and shapes of these ducts are easily understandable.

The upstream duct 40 is directly connected to the air conditioner outlet hole 32 of the air conditioner unit 30. The upstream duct 40 is located right above the air conditioner unit 30. The upstream duct 40 has an opening for receiving the air blown out of the air conditioner outlet hole 32, the opening being formed in a lower portion of the upstream duct 40. The upstream duct 40 has an upstream duct vent 41 for blowing out a part of the air flowing in the upstream duct 40 toward the operator sitting on the operator seat 201.

FIG. 9 is a schematic plan view explaining a positional relationship among the air conditioner outlet hole 32 of the air conditioner unit 30, the upstream duct 40, the guide duct 50, the side duct 60, and side duct vent 61. The upstream duct 40 has such a shape as to extend in the front-rear direction along the top surface of the air conditioner casing 33 of the air conditioner unit 30, and the opening of the upstream duct 40 is formed at a position corresponding to the air conditioner outlet hole 32.

As shown in FIG. 3 and FIG. 5, the side duct 60 is located above the side beam 20. As shown in FIG. 5, the side duct 60 extends in the front-rear direction along the lower section 81 of the side window frame 80. The side duct 60 receives at least a part of the air blown out from the air conditioner unit 30. The side duct 60 has a plurality of side duct vents for blowing out the air toward the right window SOW. The plurality of side duct vents include a first side duct vent 61 and a second side duct vent 62.

The first side duct vent 61 is disposed at a position corresponding to the first side transparent plate 80W1 in the side view for blowing out the air toward the first side transparent plate 80W1. The second side duct vent 62 is disposed at a position corresponding to the second side transparent plate 80W2 in the side view for blowing out the air toward the second side transparent plate 80W2. In the embodiment, each of the first side duct vent 61 and second side duct vent 62 is at almost the same height position as the lower section 81 of the side window frame 80, but may slightly deviate upward or downward from the lower section 81 of the side window frame 80. As shown in FIG. 4, each of the first and second side duct vents 61, 62 is provided with a louver 63 to adjust a blowing direction of the air.

The guide duct 50 guides the air blown out of the air conditioner outlet hole 32 to the side duct 60. As shown in FIG. 6 and FIG. 7, the guide duct 50 extends upward over a left side of the side beam 20 and is connected to the side duct 60. As shown in FIG. 7, the guide duct 50 and the side beam 20 are juxtaposed to each other in the left-right direction.

As shown in FIG. 7 and FIG. 9, the guide duct 50 has an inner surface (left surface) located at an outer (right) position of an innermost (leftmost) portion of the side duct 60, and the guide duct 50 further has an outer surface (right surface) located at an inner (left) position of an outermost (rightmost) portion of the side duct 60. In other words, the guide duct 50 has such a shape as to fall within the range of the side duct 60 in the plan view. The guide duct 50 in this arrangement gives no cause for narrowing the inner space of the cab 105. In this respect, a part of the guide duct 50 may deviate from the range of the side duct 60 in the plan view.

As shown in FIG. 5, FIG. 7, and FIG. 9, the guide duct 50 has a larger length in the front-rear direction than a width thereof in the left-right direction. The width of the guide duct 50 in the left-right direction is smaller than a width of the side duct 60 in the left-right direction.

As shown in FIG. 9, the guide duct 50 overlaps at least a part of the air conditioner outlet hole 32 in the plan view. At least a part of the guide duct 50 overlaps the side duct 60 in the plan view.

The first side duct vent 61 overlaps at least a part of the air conditioner outlet hole 32 in the plan view. As shown in FIG. 5, FIG. 7, and FIG. 9, the air conditioner outlet hole 32, the upstream duct 40, the guide duct 50, the side duct 60, and the first side duct vent 61 define a flow passage L1 which is linearly continuous from the air conditioner outlet hole 32 to the first side duct vent 61. The air conditioner outlet hole 32, the upstream duct 40, the guide duct 50, the side duct 60, and the first side duct vent 61 are arranged to allow at least a part of the air blown out of the air conditioner outlet hole 32 to linearly flow upward to the first side duct vent 61.

The front duct 76 receives a part of the air blown out from the air conditioner unit 30, and has a plurality of vents for blowing out the conditioned air to the upper body and the lower body of the operator sitting on the operator seat 201. The front duct 76 is excludable.

The rear duct 70 extends in the left-right direction along the rear wall 14 for receiving at least a part of the air conveyed rearward by the side duct 60. The rear duct 70 has a rear duct main body 71 located above the side duct 60, and a connection section 72 which connects the rear duct main body 71 and a rear portion of the side duct 60. The operator seat 201 is disposed in front of the rear duct 70.

The rear duct 70 has a first rear duct vent 73 for blowing out the air toward the rear transparent plate 90W1 closing the rear window 90W, and left and right second rear duct vents 74, 74 for blowing out the air frontward. As shown in FIG. 3, FIG. 4, and FIG. 6, the left and right second rear duct vents 74, 74 respectively deviate leftward and rightward from the backrest 203 in the plan view. The rear duct vent 73 is provided with a louver 63 to adjust a blowing direction of the air.

As described heretofore, the cab 105 according to the embodiment including the side beam 20 at an intermediate height position that is above the air conditioner unit 30 and below the side duct 60 can suppress an increase in a downward distance from the lower section 81 of the side window frame 80 to the side beam 20, so that the side beam 20 can reinforce the right wall 11 at a position relatively near the lower section 81 of the side window frame 80. The arrangement of the side duct 60 near the lower section 81 of the side window frame 80 can achieve the location of the first side duct vent 61, which is formed in the side duct 60, near the lower section 81 of the side window frame 80. This configuration can suppress narrowing of the inner space of the cab 105, and further attain reinforcement of the right wall 11 and ensure the visibility through the first side transparent plate 80W1. The suppression of narrowing of the inner space of the cab 105 leads to, for example, successful suppression of restrictions on a movable range of the right working device manipulation lever 211 and on a movable range of the dozer manipulation lever 213. Moreover, in the embodiment, an increase in the cost for the extension duct is avoidable.

In the cab 105 according to the embodiment, as shown in FIG. 6 and FIG. 7, the guide duct 50 extending upward over the left side of the side beam 20 which is at the intermediate height position can guide the air blown out of the air conditioner outlet hole 32 of the air conditioner unit 30 located below the side beam 20 to the side duct 60 located above the side beam 20. The guide duct 50 does not need to have the same length as the length of the side beam 20 in the front-rear direction, and may have an enough length in the front-rear direction to ensure an amount of the air to be supplied to the side duct 60. Hence, the guide duct 50 even extending upward over the left side of the side beam 20 substantially avoids narrowing the inner space of the cab 105.

In the cab 105 according to the embodiment, the air conditioner unit 30 lies along a right-front-lower portion of the right wall 11, the air conditioner outlet hole 32 is formed in an upper portion of the air conditioner unit 30, and the guide duct 50 overlaps at least a part of the air conditioner outlet hole 32 in the plan view. In the arrangement of the air conditioner unit 30 lying along the right-front-lower portion of the right wall 11 and the guide duct 50 located thereabove, the guide duct 50 can cross over the side beam 20 upward in a region except the movable ranges (operative ranges) of the manipulation levers 211, 213. Consequently, even in a case where the cab 105 has a narrow inner space and, for example, an insufficient space below the operator seat 201 like those for a short rear tail swing hydraulic excavator, the air conditioner unit 30 is arrangeable in a right-front-lower portion of the cab 105, and the guide duct 50 is arrangeable without hindering the manipulation levers 211, 213 from operating. Moreover, the guide duct 50 can receive the air blown out of the air conditioner outlet hole 32 upward thereinto at such a position as to overlap at least a part of the air conditioner outlet hole 32, and thus the amount of air to be supplied to the guide duct 50 is ensured.

In the cab 105 according to the embodiment, the first side duct vent 61 overlaps at least a part of the air conditioner outlet hole 32 in the plan view as well as the guide duct 50 which overlaps at least a part of the air conditioner outlet hole 32 in the plan view. This arrangement permits the air blown out of the air conditioner outlet hole 32 upward to smoothly flow to the first side duct vent 61 via the guide duct 50, resulting in easily ensuring the amount of air to be blown out of the first side duct vent 61. This configuration can effectively ensure visibility through a right front region which the operator frequently and visually checks through the first side transparent plate 80W1 at the position corresponding to the first side duct vent 61.

In the cab 105 according to the embodiment, the air conditioner outlet hole 32, the guide duct 50, and the first side duct vent 61 define the flow passage L1 which is linearly continuous from the air conditioner outlet hole 32 to the first side duct vent 61. This configuration pet tints the air blown out of the air conditioner outlet hole 32 upward to flow to the first side duct vent 61 more smoothly via the guide duct 50, resulting in more easily ensuring the amount of air to be blown out of the first side duct vent 61.

In the cab 105 according to the embodiment, at least a part of the guide duct 50 overlaps the side duct 60 in the plan view, and the guide duct 50 has the larger length in the front-rear direction than the width thereof in the left-right direction, and the width of the guide duct 50 in the left-right direction is smaller than the width of the side duct 60 in the left-right direction. This configuration can ensure the inner space of the cab 105 by decreasing the protrusion of the guide duct 50 inward (from the right wall 11 toward the operator seat 201) in the left-right direction, and further can ensure an enough amount of air to be supplied from the guide duct 50 to the side duct 60.

In the cab 105 according to the embodiment, the louver 63 adjusts the blowing direction of the air blown out of the side duct vent to a desired direction of the operator, and accordingly, defrosting or defogging is achievable at a desired portion of the side transparent plate. Furthermore, when the louver 63 changes the blowing direction of the air blown out of the side duct vent toward the operator seat 201, the comfortability of the operator is improved.

In the cab 105 according to the embodiment, the rear duct 70 has the rear duct main body 71 located above the side duct 60, and the connection section 72 which connects the rear duct main body 71 and the rear portion of the side duct 60. The arrangement of the side duct 60 above the side beam 20 succeeds in suppression of an increase in a tilt of the connection section 72 connecting the rear duct main body 71 and the rear portion of the side duct 60 even in the case where the rear duct main body 71 is located above the side duct 60 like the embodiment. This configuration easily ensures the amount of air to the rear duct 70.

Each of the second rear duct vents 74, 74 is located so that at least a part of each of the second rear duct vents 74, 74 deviates laterally away from the backrest 203 in the front view. This configuration where the air blows out of the second rear duct vents 74, 74 frontward can lead to effective improvement of the comfortability of the operator sitting on the operator seat. Additionally, when the air blown out of the second rear duct vents 74, 74 frontward hits a specific portion of the operator from the waist to the thighs, the comfortability of the operator against the heat generated from a console arranged in the cab 105 is improvable. The console is, for example, disposed at a side position of the seat base 202 of the operator seat 201.

Modifications

This disclosure should not be limited to the embodiment described above. This disclosure covers, for example, aspects to be described below.

(A) Air Conditioner Unit

The air conditioner unit 30 lies along the front portion of the right wall 11 in the embodiment, but may lie along the rear portion of the right wall 11, or lie along an intermediate portion of the right wall 11 between the front portion and the rear portion thereof.

(B) Duct

Although the side duct vents 61, 62 constituting a part of the side duct 60 are at substantially the same height position as the lower section 81 of the side window frame 80, and the remaining portion of the side duct 60 is located below the lower section 81 of the side window frame 80 in the embodiment shown in FIG. 5, these positions are not limited thereto. The side duct 60 may extend in the front-rear direction along the lower section 81 of the side window frame 80 in a state where an upper portion of the side duct 60 (e.g., a portion formed with the side duct vent of the side duct 60) is located above the lower section 81 of the side window frame 80). Alternatively, the side duct 60 may extend in the front-rear direction along the lower section 81 of the side window frame 80 in a state where an entirety of the side duct 60 is located below the lower section 81 of the side window frame 80.

Besides, in a configuration where the guide duct 50 is directly connected to the air conditioner outlet hole 32 of the air conditioner unit 30, the upstream duct 40 is excludable.

(C) Side Beam

Although the side beam 20 has the shape extending from the front end to the rear end of the right wall 11 in the embodiment, the side beam 20 does not necessarily extend from the front end to the rear end of the right wall 11. Further, the side beam 20 is located above the air conditioner unit 30 in the embodiment, but may not be necessarily located above the air conditioner unit 30. The side beam 20 may be located, for example, below the air conditioner unit 30, or may be located at a height position between an upper end and a lower end of the air conditioner unit 30.

(D) Specified Side Wall

Although the specified side wall defined in the disclosure is the right wall in the embodiment, the specified side wall may be the left wall in a configuration where the right wall has the getting-in-and-out section.

(E) Construction Machine

The construction machine according to the embodiment is the short rear tail wing hydraulic excavator, but is not limited to such a short rear tail swing type, but may be a construction machine which is larger than the short rear tail swing type. The dozer 111 may be excludable in the construction machine.

As described above, this disclosure provides a cab for a construction machine, which can suppress narrowing of an inner space of the cab, and further attain reinforcement of a side wall and ensure visibility.

A provided cab for a construction machine includes: a right wall and a left wall spaced from each other in a left-right direction, one of the right and left walls having a getting-in-and-out section, and the other of the right and left walls serving as a specified side wall having a side window frame defining a side window and at least one side transparent plate supported by the side window frame; an air conditioner unit having an air conditioner outlet hole for blowing out air; a side beam extending in a front-rear direction along the specified side wall and below the side window frame; and a side duct located above the side beam, extending in the front-rear direction along a lower section of the side window frame, and receiving at least a part of the air blown out from the air conditioner unit, the side duct having at least one side duct vent for blowing out the air toward the at least one side transparent plate.

In the cab, the arrangement of the side duct extending in the front-rear direction along the lower section of the side window frame and above the side beam which reinforces the specified side wall below the side window frame can achieve the location of the side duct vent, which is formed in the side duct, near the lower section of the side window frame without providing an extension duct branching and extending upward from the side duct and without juxtaposing the side beam and the side duct to each other in the left-right direction. This configuration can suppress narrowing of the inner space of the cab, and further attain reinforcement of the specified side wall and ensure the visibility through the side transparent plate.

The side beam is preferably located above the air conditioner unit. This configuration including the side beam at the intermediate height position that is above the air conditioner unit and below the side duct can suppress an increase in the downward distance from the lower section of the side window frame to the side beam, so that the side beam can reinforce the specified side wall at a position relatively near the lower section of the side window frame. Consequently, effective reinforcement of the specified side wall and the location of the side duct vent of the side duct near the lower section of the side window frame are compatible.

The cab for a construction machine preferably further includes: a guide duct extending upward over a side of the side beam and connected to the side duct for guiding the air blown out of the air conditioner outlet hole to the side duct. In this configuration, the guide duct extending upward over the side of the side beam which is at the intermediate height position can guide the air blown out of the air conditioner outlet hole of the air conditioner unit located below the side beam to the side duct located above the side beam. The guide duct does not need to have the same length as the length of the side beam in the front-rear direction, and may have such a length in the front-rear direction as to ensure an enough amount of the air to be supplied to the side duct. Hence, the guide duct even extending upward over the side of the side beam substantially avoids narrowing the inner space of the cab.

The air conditioner unit preferably lies along a front portion of the specified side wall. The air conditioner outlet hole is preferably formed in an upper portion of the air conditioner unit. The guide duct preferably overlaps at least a part of the air conditioner outlet hole in a plan view. In the arrangement of the air conditioner unit lying along the front portion of the specified side wall and the guide duct located thereabove, the guide duct can cross over the side beam upward in a region except the movable ranges (operative ranges) of the manipulation levers. Consequently, even in a case where the cab has a narrow inner space and, for example, an insufficient space below the operator seat like those for a short rear tail swing hydraulic excavator (small excavator), the air conditioner unit is arrangeable in a right-front-lower portion or left-front-lower portion of the cab, and the guide duct is arrangeable without hindering the manipulation levers from operating. Moreover, the guide duct can receive the air blown out of the air conditioner outlet hole upward thereinto at such a position as to overlap at least a part of the air conditioner outlet hole, and thus the amount of air to be supplied to the guide is ensured.

The at least one side duct vent preferably overlaps at least a part of the air conditioner outlet hole in the plan view. In this configuration, the at least one side duct vent overlaps at least a part of the air conditioner outlet hole in the plan view as well as the guide duct which overlaps at least a part of the air conditioner outlet hole in the plan view. This arrangement permits the air blown out of the air conditioner outlet hole upward to smoothly flow to the side duct vent via the guide duct, resulting in easily ensuring the amount of air to be blown out of the side duct vent.

The air conditioner outlet hole, the guide duct, and the at least one side duct vent preferably define a flow passage which is linearly continuous from the air conditioner outlet hole to the at least one side duct vent. This configuration permits the air blown out of the air conditioner outlet hole upward to flow to the side duct vent more smoothly via the guide duct, resulting in more easily ensuring the amount of air to be blown out of the first side duct vent.

At least a part of the guide duct preferably overlaps the side duct in the plan view. The guide duct preferably has a larger length in the front-rear direction than a width thereof in a left-right direction. The width of the guide duct in the left-right direction is preferably smaller than a width of the side duct in the left-right direction. This configuration can ensure the inner space of the cab by decreasing the protrusion of the guide duct inward (from the specified side wall toward the operator seat) in the left-right direction, and further can ensure the amount of air to be supplied from the guide duct to the side duct.

The at least one side transparent plate preferably includes a first side transparent plate in a front portion of the side window and a second side transparent plate in a rear portion of the side window. The at least one side duct vent preferably includes a first side duct vent for blowing out the air toward the first side transparent plate and a second side duct vent for blown out the air toward the second side transparent plate. This configuration achieves defrosting or defogging at each of the first side transparent plate and the second side transparent plate, and thus can ensure the visibility through each of the first side transparent plate and the second side transparent plate.

The at least one side duct vent is preferably provided with a louver to adjust a blowing direction of the air. In this configuration, the louver adjusts the blowing direction of the air blown out of the side duct vent to a desired direction of the operator, and accordingly, defrosting or defogging is achievable at a desired portion of the side transparent plate.

The cab for a construction machine preferably further includes: a rear wall which connects a rear end of the right wall and a rear end of the left wall; and a rear duct extending in the left-right direction along the rear wall for receiving at least a part of the air conveyed rearward by the side duct. This configuration can supply the air blown out from the air conditioner unit to the rear duct through the side duct.

The rear duct preferably has a rear duct main body located above the side duct, and a connection section which connects the rear duct main body and a rear portion of the side duct. The above-described arrangement of the side duct above the side beam succeeds in suppression of an increase in a tilt of the connection section connecting the rear duct main body and the side duct even in the case where the rear duct main body is located above the side duct like the embodiment. This configuration easily ensures the amount of air to the rear duct.

The rear wall preferably has a rear window frame defining a rear window and a rear transparent plate supported by the rear window frame. The rear duct preferably has a first rear duct vent for blowing out the air toward the rear transparent plate. This configuration can achieve defrosting or defogging at the rear transparent plate, and thus can ensure the visibility through the rear window.

The cab for a construction machine preferably further includes: an operator seat disposed in front of the rear duct and having a seat base and a backrest. The rear duct further preferably has a second rear duct vent for blowing out the air frontward, at least a part of the second rear duct vent being laterally away from the backrest in a front view. This configuration where the air blows out of the second rear duct vent frontward can effectively improve the comfortability of the operator sitting on the operator seat.

This application is based on Japanese Patent application No. 2021-058274 filed in Japan Patent Office on Mar. 30, 2021, the contents of which are hereby incorporated by reference.

Although this disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A cab for a construction machine, comprising:
a right wall and a left wall spaced from each other in a left-right direction, one of the right and left walls having a getting-in-and-out section, and the other of the right and left walls serving as a specified side wall having a side window frame defining a side window and at least one side transparent plate supported by the side window frame;
an air conditioner unit having an air conditioner outlet hole for blowing out air;
a side beam extending in a front-rear direction along the specified side wall and below the side window frame; and
a side duct located above the side beam, extending in the front-rear direction along a lower section of the side window frame, and receiving at least a part of the air blown out from the air conditioner unit, the side duct having at least one side duct vent for blowing out the air toward the at least one side transparent plate,
wherein the side beam is located above the air conditioner unit.

2. The cab according to claim 1, further comprising:
a guide duct extending upward over a side of the side beam and connected to the side duct for guiding the air blown out of the air conditioner outlet hole to the side duct.

3. The cab according to claim 2, wherein
the air conditioner unit lies along a front portion of the specified side wall,
the air conditioner outlet hole is formed in an upper portion of the air conditioner unit, and
the guide duct overlaps at least a part of the air conditioner outlet hole in a plan view.

4. The cab according to claim 3, wherein
the at least one side duct vent overlaps at least a part of the air conditioner outlet hole in the plan view.

5. The cab according to claim 4, wherein
the air conditioner outlet hole, the guide duct, and the at least one side duct vent define a flow passage which is linearly continuous from the air conditioner outlet hole to the at least one side duct vent.

6. The cab according to claim 2, wherein
at least a part of the guide duct overlaps the side duct in the plan view,
the guide duct has a larger length in the front-rear direction than a width thereof in a left-right direction, and
the width of the guide duct in the left-right direction is smaller than a width of the side duct in the left-right direction.

7. The cab according to claim 1, wherein
the at least one side transparent plate includes a first side transparent plate in a front portion of the side window and a second side transparent plate in a rear portion of the side window, and
the at least one side duct vent includes a first side duct vent for blowing out the air toward the first side transparent plate and a second side duct vent for blowing out the air toward the second side transparent plate.

8. The cab according to claim 1, wherein
the at least one side duct vent is provided with a louver to adjust a blowing direction of the air.

9. The cab according to claim 1, further comprising:
a rear wall which connects a rear end of the right wall and a rear end of the left wall; and
a rear duct extending in the left-right direction along the rear wall for receiving at least a part of air conveyed rearward by the side duct.

10. The cab according to claim 9, wherein
the rear duct has a rear duct main body located above the side duct, and a connection section which connects the rear duct main body and a rear portion of the side duct.

11. The cab according to claim 10, wherein
the rear wall has a rear window frame defining a rear window and a rear transparent plate supported by the rear window frame, and
the rear duct has a first rear duct vent for blowing out the air toward the rear transparent plate.

12. The cab according to claim 10, further comprising:
an operator seat disposed in front of the rear duct and having a seat base and a backrest, wherein
the rear duct further has a second rear duct vent for blowing out the air frontward, at least a part of the second rear duct vent being laterally away from the backrest in a front view.

* * * * *